UNITED STATES PATENT OFFICE.

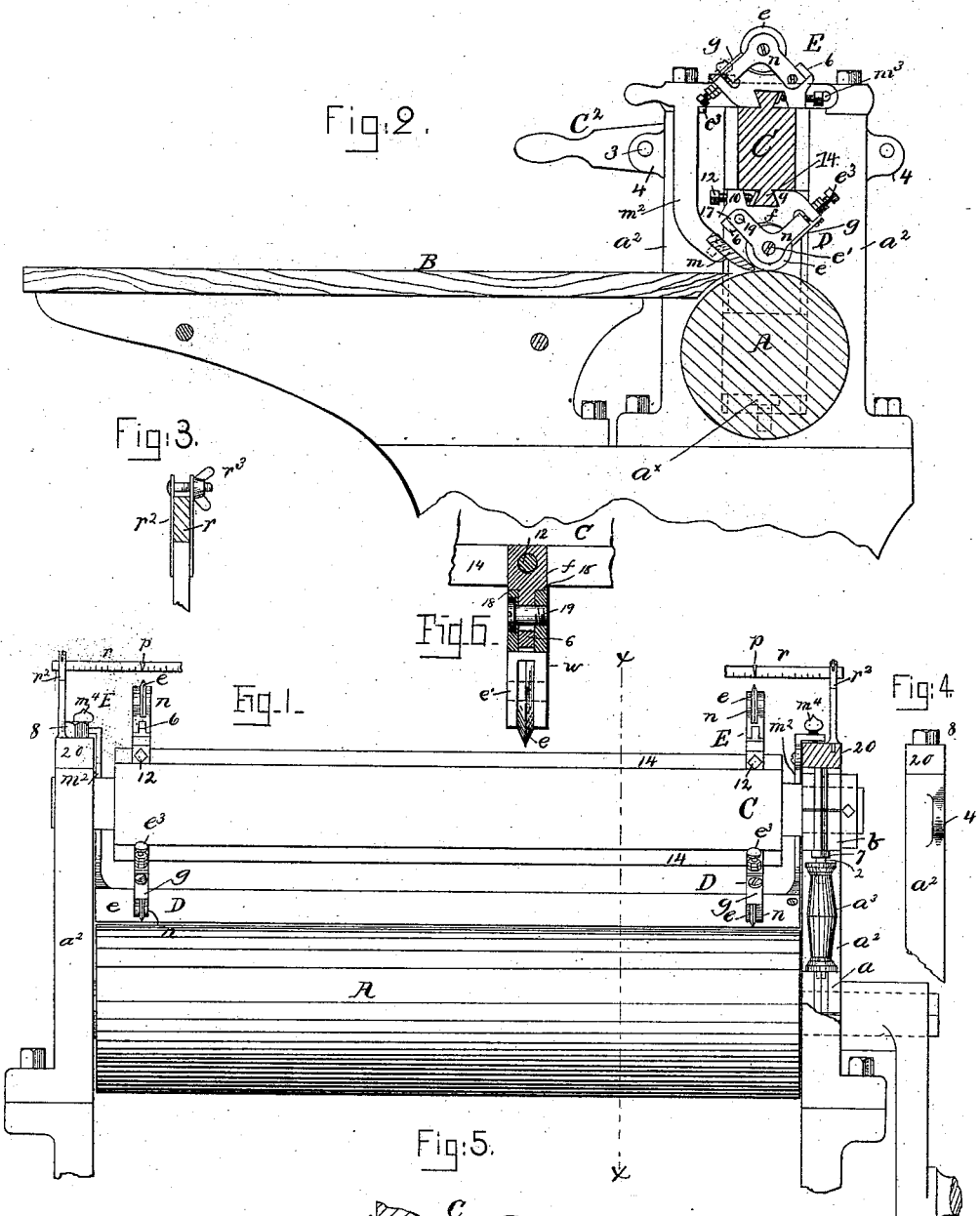

JOHN T. ROBINSON, OF HYDE PARK, MASSACHUSETTS.

MACHINE FOR CUTTING PAPER-BOARD.

SPECIFICATION forming part of Letters Patent No. 273,394, dated March 6, 1883.

Application filed July 22, 1882. (No model.)

*To all whom it may concern:*

Be it known that I, JOHN T. ROBINSON, of Hyde Park, county of Norfolk, State of Massachusetts, have invented an Improvement in Machines for Cutting or Scoring Paper-Board, of which the following description, in connection with the accompanying drawings, is a specification.

My invention in paper-board cutter or machine has for its object to facilitate the production of a machine having two independent series of cutters, either of which may be brought into operative position by changing the position of the bar which carries the said cutters; and my invention consists, essentially, in a cutter-carrying bar having two independent sets of cutters, and made to turn in bearings to enable either set of cutters to be brought into operative position at will, combined with a bed-roller on which the paper-board rests, and also in other features set forth in the claims at the end of this specification. To accomplish this, as herein shown, I have applied two sets of cutters upon a common shaft or bar held in suitable bearings, the partial rotation of the bar bringing into operative position the desired set of cutters. I have also made certain improvements, as will be hereinafter described, in the construction of the devices for holding and adjusting the disks of the cutters to regulate the depth of their cut into the paper.

Figure 1 represents in front elevation a sufficient portion of a paper-board cutting or scoring machine to illustrate my improvements, part of the frame-work being broken out; Fig. 2, a longitudinal section on the line $x\,x$; Fig. 3, a detail of the rule-holder; Fig. 4, a detail of the frame-work to be referred to; Fig. 5, an enlarged section of the cutter and parts for adjusting it; and Fig. 6, a section of the block and yoke in the dotted line $x^2$, Fig. 5.

The roller A and table B are common to other cutting and scoring machines. The journals of roller A are entered into boxes $a$, between the uprights $a^2$ of the frame-work. The boxes $a$ are made in two parts, and the lower parts are made vertically adjustable by the adjusting-nut $a^x$, (shown in dotted lines,) so as to maintain the surface of roller A at the proper level with relation to the table B. Standards $a^3$, resting on the upper parts of boxes $a$, receive the stems of screws 2, having nuts 7, which support the lower parts or halves of the boxes $b$, which are thus made adjustable. The upper part or half of each box $b$ is held down in place by set-screw 8. The boxes $b$ support the journals of the shaft or bar C, adapted, as herein shown, to receive two sets of cutters, such as shown at D E, each set being entirely independent of the other. The shaft or bar C is herein shown as having but four sides, and but two of such sides are shaped to receive the clamping-blocks $f$ of the cutters. The bar C is provided at one end with a hand-lever, $C^2$, by which to turn it, the said lever being made preferably of spring metal, and having a fixed pin, 3, adapted to enter either of the holes in the ears 4 of the uprights $a^2$, according to the position of the handle.

In Fig. 2 the cutters D are in working position; but should the handle be reversed and the bar be turned so that the pin 3 would enter the hole in the ear 4 at the right of Fig. 2, then the cutters E would be in working position. Each cutter is composed of a disk-knife, $e$, turning on a pin or stud, $e'$, in an angular yoke, $n$, one arm of which is tapped to receive an adjusting-screw, $e^3$, while the other arm is slotted or shaped to slide on a slotted guide or narrow web, 6, of the clamping-block $f$. This clamping-block is provided with two ears, 9 10, one of which receives a set-screw, 12, one of the said ears and the set-screw, or an interposed gib, (see Fig. 5,) being adapted to fit the dovetailed projection 14, extended from end to end of the bar C. A metal plate, $g$, attached to the clamping-block by a screw, $g^6$, (see Fig. 5,) acts against one side of one arm of the yoke $n$, and keeps it pressed steadily against the guiding-face 16 of the block, and the forked end 17 of the opposite arm of the said yoke (see Fig. 2) rests against and, when moved, is guided in a straight line by the straight shoulders 18 on another part of the clamping-block $f$, the said shoulders being herein shown as located at each side of the guide or web 6. The screw 19 merely acts to prevent the withdrawal of the forked end of the yoke $n$ from the guide 6, and does not act as a pivot or center about which the yoke turns. In changing the depth at which the disk shall cut into or score the paper-board resting on roller A the yoke is moved only diagonally in a straight line. The adjusting-screw $e^3$ has applied to it usual clamping and set nuts. The clamping-blocks $f$ may be moved longitudinally on the bar C and be secured in proper adjusted position by the set-screws 12. The cutters D and E (any desired number in a row) may be adjusted at the proper distances apart, according to the work to be done, and either set of cutters may be brought into operative position by partially rotating the bar C, and the cutters of one set may be adjusted into any desired position longitudinally without interfering with the cutters of the other set.

In a box-factory using my machine it will be supposed that the cutters at one side of the bar are set for, and that the machine is at work cutting or scoring paper-board for, a large order. Now, if it becomes necessary or it is desired to cut or score but a few sheets of paper-board for another small order, one may quickly set the cutters on the other side of the bar to cut and score as desired to fill the small order, thus obviating loosening and resetting the cutters for the small lot, and then loosening and resetting them in their position for the large order. The loss of time for such adjustment would frequently cost more than the profit to be derived in furnishing the small order. In practical work it is very desirable to cut or score in both directions paper-board to be made into boxes before running through a large lot of paper-board and cutting and scoring it in one direction.

By setting the cutters at one side of the bar to cut or score the paper-board in one of its two directions, and the cutters at the opposite side of the bar to cut and score the paper-board in the opposite direction, one can verify the correctness of the positions of the cutters and the condition of the box-blank before running through a large lot of paper-board. The cutters at one side of the bar may be kept set for regular work, and those at the other side be adjusted from time to time for odd jobs, some of which would not pay for the adjustment of the cutters doing regular work.

To enable the paper-board to be held on the bed-roller A close to the point where the cutting-disks strike it, I have employed a presser-bar, $m$, connected at its ends with bent levers or arms $m^2$, pivoted at $m^3$ upon one side of the caps 20, secured to the uprights $a^2$. The levers $m^2$ have ears which receive adjusting-screws $m^4$, the ends of which rest on the caps 20, so that the adjustment of the screws $m^4$ controls the position of the lower end or edge of the presser-bar $m$. If it is desired to gain access to the disks, the presser-bar $m$ may be turned over backward on the centers $m^3$, and, when desired, be returned to its former position without manipulation of adjusting-screws.

To facilitate the adjustment of the cutters at the required distance apart, I employ a rule, $r$, which will be suitably held at each end by jaws $r^2$ and set-screw $r^3$, constituting a clamp. The rule has on it a suitable number of sliding pointers, $p$, one for each cutter. A rule having its series of pointers $p$ placed at the required distance apart will be applied to the machine and be held by the clamps, and the clamping-blocks $f$ will then be moved or adjusted on the dovetailed projections 14, each disk $e$ being placed opposite a pointer. Instead of making the projection 14 dovetailed in shape, it might be of other suitable shape.

I claim—

1. In a paper-board cutting or scoring machine, the bed-roller and cutter-carrying bar, combined with two independent rows of cutters, either row of which may be brought into operative position with relation to the paper-board on the roller A by a partial rotation of the said bar, substantially as described.

2. The bar C, its projection 14, and the clamping-block $f$, made adjustable horizontally on the said bar, combined with the cutting-disk, its carrying-yoke $n$, fitted to and guided by parts of the clamping-block, as described, and with the adjusting-screw $e^3$, to adjust the same diagonally on the clamping-block to raise or lower the cutting-disk with relation to the roller A, all substantially as set forth.

3. The clamping-block, its slotted guide 6 and shoulder, and the adjusting-screw $e^3$, combined with the cutting-disk, and the yoke $n$, one end of which is directed by the said guide and shoulder, while its other end is adjusted by the screw $e^3$, substantially as shown and described.

4. The roller A, the bar C, and its two rows or sets of adjustable cutters, combined with the presser-bar carried by the arms $m^2$, to permit the presser-bar to be readily turned back from the roller and cutters, as described.

In testimony whereof I have signed my name to this specification in the presence of two subscribing witnesses.

JOHN T. ROBINSON.

Witnesses:
G. W. GREGORY,
B. J. NOYES.